Sept. 14, 1943.  W. MacWILLIAM ET AL  2,329,281

HOSE COUPLING

Filed March 20, 1942

INVENTORS
Wallace MacWilliam and
BY Fred Wm. Thiemann
Williams, Rich & Morse
ATTORNEYS.

Patented Sept. 14, 1943

2,329,281

UNITED STATES PATENT OFFICE 2,329,281

HOSE COUPLING

Wallace MacWilliam, Nutley, and Fred W. Thiemann, Bloomfield, N. J., assignors to Resistoflex Corporation, Belleville, N. J., a corporation of New York Application March 20, 1942, Serial No. 435,590

1 Claim. (Cl. 285—84)

This invention relates to hose couplings. More particularly it relates to that type of metallic coupling which is affixed to the end of a flexible hose or tubing and comprises a shank which is inserted into the end of the hose and a concentric ferrule which surrounds the hose end and is contracted upon it, thereby causing the hose to be gripped between the shank and the ferrule.

In couplings of this type it is desirable that the outer surface of the shank or the inner surface of the ferrule, or both, shall have a ribbed or otherwise roughened surface to improve the grip of the coupling on the hose. Couplings have heretofore been made in which the ferrule and shank are formed from a single piece of metal by boring an annular chamber therein to receive the hose end. In this method of construction, particularly in smaller sizes of couplings, there is insufficient working space in said annular passage to enable the production of the desired irregular surface on the shank or ferrule. It has, therefore, been the practice in making such couplings to form the shank and ferrule in two pieces, thus making it possible to provide on the shank or ferrule, prior to assembling them together, any desired surface configuration. Such separate shanks and ferrules have been provided with complementary threads so that they may be screwed together. This, however, requires substantial time for assembling the coupling and moreover there is the possibility of relative rotation between the shank and the ferrule. It is, moreover, necessary to cut separate threads on two parts which increases the cost.

The present invention has for its principal object the provision of an improved coupling of the type described which is of more economical construction, which may be more rapidly assembled and in which the shank and ferrule are positively secured against relative rotation.

Other objects of the invention will in part be obvious and in part will appear from the following description of the present preferred embodiment of the invention taken in conjunction with the drawing in which.

Figure 1:
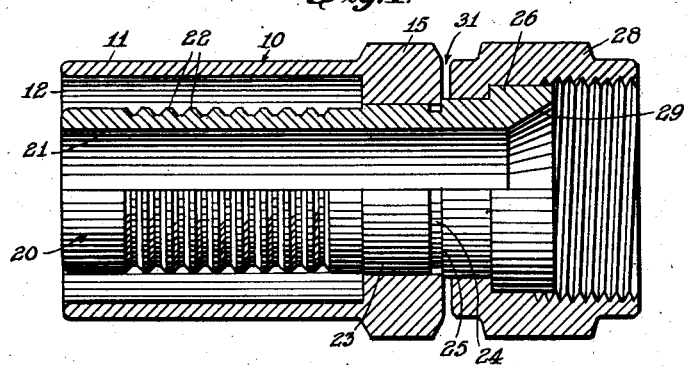
Fig. 1 is a longitudinal sectional view of a complete coupling prior to its attachment to a hose.
Figure 2:
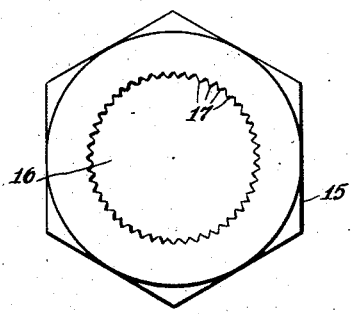
Fig. 2 is a plan view of the end of the ferrule, as seen from the right of Fig. 1 before assembly.
Figure 4:
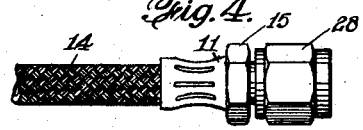
Fig. 4 is a side elevation of the completed coupling attached to a hose end and crimped thereon.

Referring to Figs. 1 and 2, the ferrule 10 is formed in any suitable manner, as by turning from hexagonal bar stock, with a relatively thin-walled skirt portion 11, cylindrical in form and defining a hose chamber 12 adapted to receive the end of a flexible tubing or hose 14 (Fig. 4). The head 15 of the ferrule is left relatively thick and its hexagonal outer surface is adapted to receive a wrench. An axial hole 16 is bored in the head, the initial diameter of the hole being referred to herein as the "free bore" of the hole. The wall of this hole is then broached with a suitable tool to form splines 17 which extend all the way around its periphery. The diameter of the broached hole measured between the splines is referred to as its "maximum diameter."

The shank 20, which is generally in the form of a hollow cylinder, is formed, reading from left to right in Fig. 1, with an end portion 21 for insertion inside the hose which has a maximum diameter such as will pass freely through the free bore of the hole 16. The surface of the end portion 21 may be provided with a series of ribs 22 or any other surface desired for gripping the hose end. Next comes a slightly larger initially smooth cylindrical portion 23, the diameter of which is intermediate the free bore and the maximum diameter of the hole 16. In the preferred form of the invention the portion 23 is immediately followed by a groove or reduced portion 24, the diameter of which, measured at the bottom of the groove, is no greater than the diameter of the free bore of hole 16. The function of the groove 24 will be explained later. Next comes a further enlargement of the shank to form a shoulder 25 against which the head 15 will abut when the parts are assembled and beyond which it will not pass.

The configuration of the remainder of the shank depends upon the particular type of connection which it is desired to attach to the hose. As shown in the drawing, the shank is formed with a collar 26 behind which is carried a flanged, internally threaded nut 28 for securing a complementary member with a tapered face against the conical seat 29 of the shank. Obviously these last mentioned parts may take a variety of forms depending on whether the coupling is male or female and on the various types of seats employed.

Having formed the shank and ferrule as described above, they are assembled by merely pushing the shank 20 into the hole 16 in the ferrule, while supporting the parts in appropriate fixtures or jigs. In the 3-piece fitting of Fig. 1, the nut 28 would of course be placed on the shank before inserting the shank in the ferrule.

Figure 3:
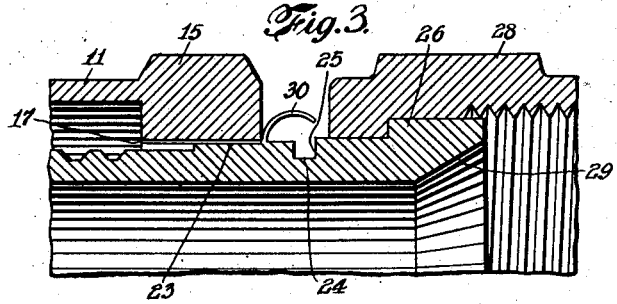
Fig. 3 is an enlarged detail in cross section showing the shank in the process of being assembled with the ferrule.

Referring to Fig. 3, as the smooth cylindrical portion 23 of the shank is forced into the splined hole 16, the splines 17 cut into the metal of the shank. This is likely to produce shavings or chips of metal of various sizes and forms depending on the metal of which the coupling is made. One such chip or shaving is shown at 30. Unless some means is provided for assuring the severence of such shavings from the shank before the head 15 is seated against shoulder 25, they may permanently extend into the space 31 (Fig. 1) between the ferrule and the nut. The groove 24 is provided to positively detach any metal cut out by the splines. As the splines reach the end of the cylindrical section 23, the shavings will be freed as soon as the groove 24 is reached and the loose metal will fall out, thus assuring a clean joint.

As an example of suitable dimensions of the interlocking parts for a given size of fitting, the following have been found suitable:

|  | Inches |
|---|---|
| Free bore of hole 16 | 0.650 |
| Maximum diameter of hole 16 | 0.666 |
| Cylindrical portion 23 | 0.660–0.662 |

Fig. 4 shows a fitting of the type described after assembly to a hose end 14, permanent attachment to the hose being effected by crimping the skirt 11 of the ferrule as shown to compress the tubing against the end 21 of the shank. It is to be understood that prior to crimping, the assembled fitting is pushed onto the hose until the hose end abuts the inner face of the head 15.

Since certain changes may be made in the above embodiment of the invention without departing from the scope thereof, it is intended that all matter in the above description and in the drawing is to be interpreted as illustrative and not in a limiting sense.

What is claimed is:

A hose coupling comprising: a ferrule having a skirt portion defining a hose chamber and an integral head of substantial thickness provided with an axial round hole having a splined wall; and a shank having in succession an end for insertion in the hose of a diameter to pass freely through said hole, a larger initially smooth cylindrical portion of a diameter intermediate the free bore of said hole and its maximum diameter, a groove or reduced portion of no greater diameter than the free bore of said hole, and a shoulder of larger diameter than said cylindrical portion; said shank being inserted in said ferrule so that the splined wall of the hole grips said cylindrical portion of the shank by engagement of the splines with grooves cut into said initially smooth portion by the splines during insertion of said shank into said ferrule and so that the head of the ferrule abuts said shoulder.

WALLACE MacWILLIAM.
FRED WM. THIEMANN.